3 Sheets--Sheet 1.

F. G. HESSE.
Water-Wheel and Hydraulic-Governor.

No. 161,035. Patented March 23, 1875.

Witnesses: Inventor:

3 Sheets--Sheet 2.

F. G. HESSE.
Water-Wheel and Hydraulic-Governor.

No. 161,035. Patented March 23, 1875.

Witnesses:
James Martin Jr.
C. N. Campbell

Inventor:
Frederick G. Hesse
by
Mason, Fenwick & Lawrence
att'ys.

THE GRAPHIC CO. PHOTO-LITH. 39 & 41 PARK PLACE, N.Y.

3 Sheets--Sheet 3.
F. G. HESSE.
Water-Wheel and Hydraulic-Governor.
No. 161,035.  Patented March 23, 1875.
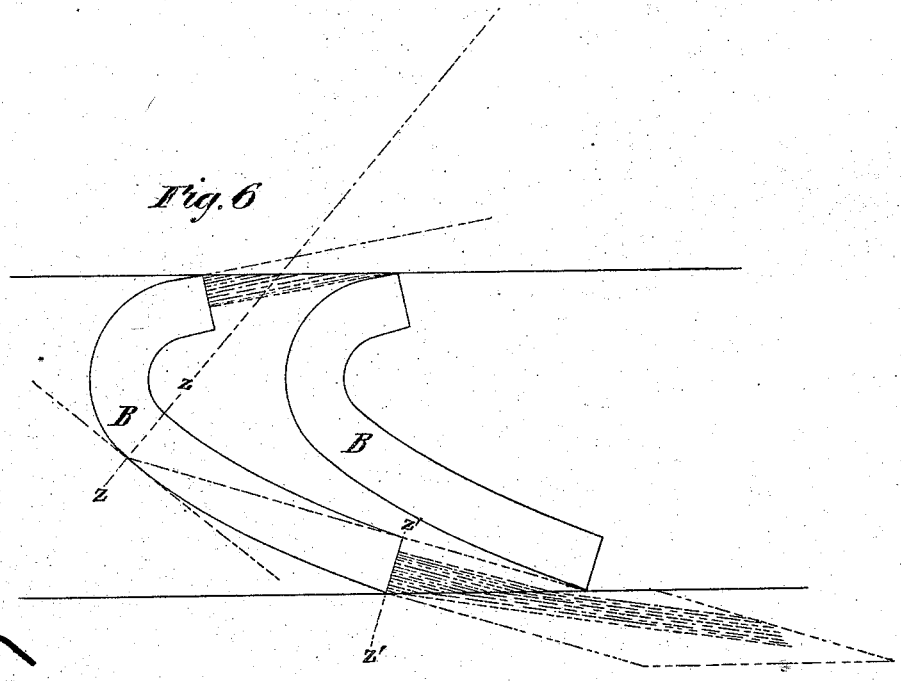
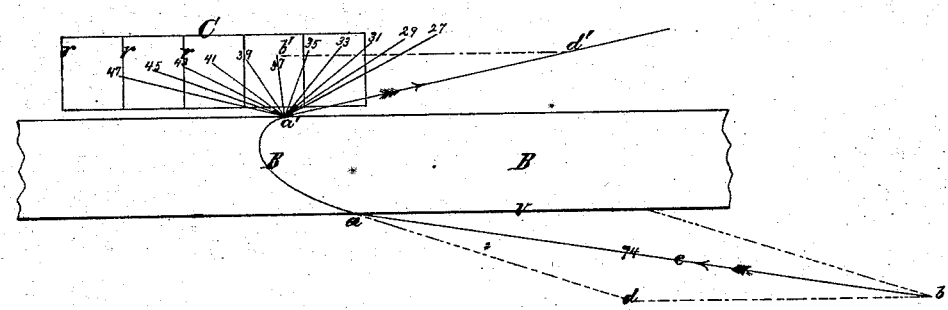
Witnesses:
James Martin Jr.
J. N. Campbell.
Inventor:
Frederick G. Hesse
by
Mason, Fenwick & Lawrence
attys.

UNITED STATES PATENT OFFICE.

FREDERICK G. HESSE, OF OAKLAND, CALIFORNIA.

IMPROVEMENT IN WATER-WHEELS AND HYDRAULIC GOVERNORS.

Specification forming part of Letters Patent No. 161,035, dated March 23, 1875; application filed March 31, 1873.

*To all whom it may concern:*

Be it known that I, FREDERICK G. HESSE, of Oakland, in the county of Alameda, in the State of California, have invented a new and Improved Water-Wheel in Combination with a Hydraulic Governor, whereby the velocity of the wheel is made self-regulating, so as to yield the best efficiency under varying head and load; and I do hereby declare that the following is a full and exact description thereof, reference being had to the accompanying drawings, and to the letters of reference marked thereon.

Figure 1:
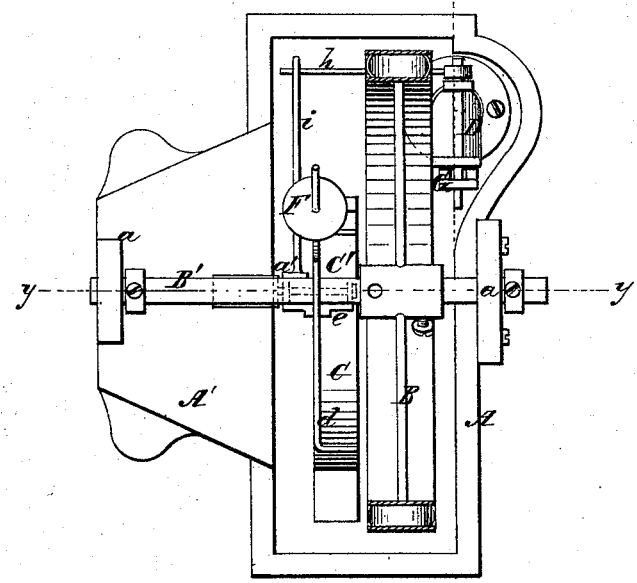
Figure 2:
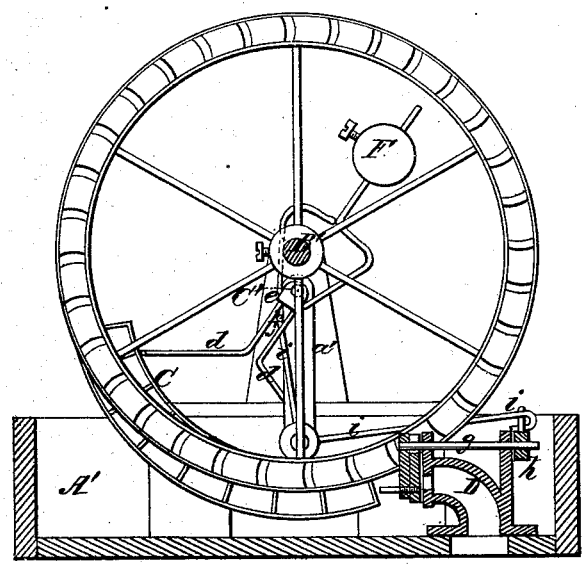
Figure 3:
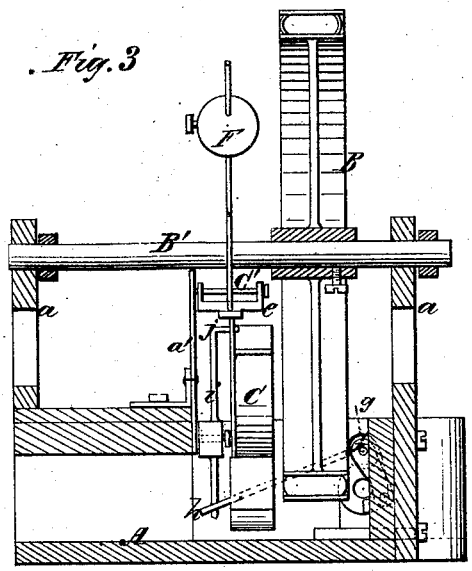
Figure 4:
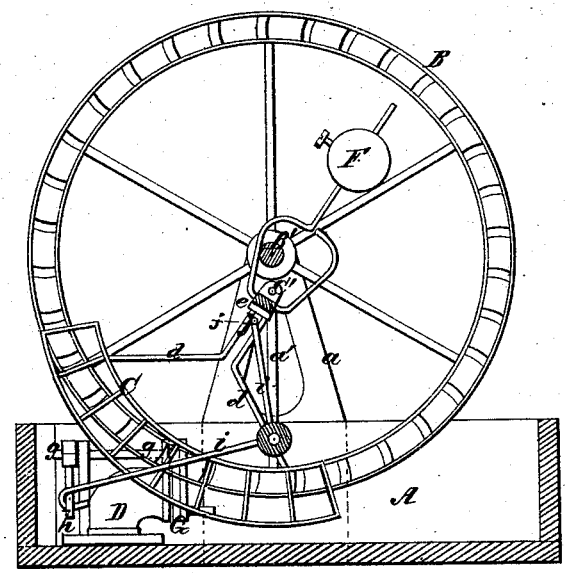

Figure 1 is a top view, Fig. 2 is a vertical section in the line $x\ x$ of Fig. 1, Fig. 3 is also a vertical section in the line $y\ y$ of Fig. 1, and Fig. 4 a longitudinal section, of my improved water-wheel having a hydraulic-governor attachment. Figs. 5 and 6 are diagrams, illustrating the operation of the wheel. Figs. 7 and 8 are sections in the lines $z\ z$ and $z'\ z'$, showing the form of the tubular buckets or passages at different points.

The nature of my invention consists, first, in a wheel having curved buckets or water-passages through it, extending from face to face, between inner and outer rims, in combination with a single water-pipe, which is arranged to discharge the stream of water tangentially upon the buckets as they come in a certain relation to the pipe; second, in buckets extending through a wheel from face to face thereof, and having the curvature hereinafter specified, and their receiving ends set considerably in advance of their discharging ends, in combination with a single water-pipe, which is arranged to discharge the stream of water tangentially upon the buckets when the buckets come in a certain relation to the pipe; third, in a valve applied for regulating the supply of water through the pipe, in combination with a balanced vibrating segment of a governor-wheel having buckets through it from face to face, whereby the velocity of the wheel can be made uniform, this combination causing the supply of water to be decreased when the wheel attains a higher velocity than is desired.

In the accompanying drawings, A is a cast-iron shallow vessel with an escape chute, A', to receive the discharge-water and conduct it off. It also serves as a support or foundation for the bearing-standards $a\ a\ a'$ of the wheel B, its governing-segment C, and elbow water-induction pipe, D, as shown. The shaft B' of the wheel B is mounted in boxes of the standards $a\ a$, and the pivot C' of the governing-segment C is attached to the upper end of the standard $a'$. The wheel B consists of a hub, spokes, and an inner and outer rim and curved buckets or curved tubes placed in between the rims, as shown in the drawings. These buckets or tubes have a curvature similar to that represented, and they are set the reverse of any other known tangential wheel, their discharging end being in rear of their receiving end, and the deepest or shortest curve between these ends being nearest the discharging end of the bucket. This wheel is arranged on the shaft B', partly within the vessel A. The governing-segment C is formed of two segmental rims, with radial bucket-plates between them, and closing end plates. This segment has two arms, $d$, which unite in a vibrating eye-piece, $e$, fitted loosely upon the pivot C'. Thus arranged, the segment-governor, when in its normal or proper acting position, stands with its rim very nearly concentric with a portion of the rims of the wheel B, the inner rim being in very nearly the same radius as the inner rim of the wheel, and the outer rim on a radius which is some distance beyond the outer rim of the wheel; but, while this is the case, the extreme radiuses of the governing-segment are not much if any greater than the extreme radiuses of the water-wheel. The difference mentioned is due to the depth of the radial plates forming the buckets of the segments, the distance apart of the rims above and below them, and the location of the pivot of the governing-segment below the shaft of the wheel. The increased depth of bucket for the governing-segment is required in order to keep the buckets of the segment in full communication with the buckets of the wheel when the governing-segment has moved to the right or left, and its rims have become eccentric to the rims of the wheel.

F is a balance-weight on a forked rod, which extends up from the eye-piece $e$ on each side of the shaft B', as shown. This weight holds the segment-governor with its rims in nearly a concentric position with respect to the rims of the wheel when the wheel is running at its best speed. G is a rocking valve, placed at the front of the elbow-pipe for closing the same when the wheel is not in operation. The shaft $g$ of this valve is hung in standards on top of the elbow-pipe, and to the outer end of this shaft a rocking arm, $h$, is fastened, said rocking arm having its other end passed through a slot in one arm of an elbow-crank connecting-lever, $i$ $i$, which is pivoted at its elbow to the base of the standard $a'$, and extended up a proper distance, and turned in at $j$ between the arms of the governing-segment.

By this arrangement of the valve and its connections, any movement out of balance on the part of the segment will cause the elbow-crank lever to turn on its pivot, and thereby raise the rocking arm of the rocking valve, and cause the valve to move farther over the orifice of the elbow-pipe, and thus diminish the supply of water through the same, and regulate thereby the speed of the wheel.

To explain the operation, reference will be particularly made to Fig. 5 of the drawings.

The water enters in the direction $a$ $b$, and flows along the bucket with a relative velocity nearly equal to the difference between the velocity $c$ (seventy-four feet) of the water as it issues from the orifice of the nozzle and the velocity of the wheel. The water escapes with this relative velocity $c$ in the direction $a'$ $d'$; but, since the bucket and the wheel have the velocity of the wheel in common, the absolute direction and velocity $a$ $c$ of the jet will be the resultant of the two named velocities $a$ $d$, $c$ $v$, and $b$ $v$.

It is obvious that for a velocity of the wheel equal to one-half that of the jet $a$ $b$, this absolute velocity $a$ $b$ is a minimum.

If the wheel revolves with less or more velocity, the water will escape in either case with a corresponding increase of speed, and its direction will be backward or forward relatively to $a$ $b$.

Diagram, Fig. 5, shows these velocities and directions, with the velocities of the wheel marked on top, and with the assumption that the velocity of the jet $a$ $b$ is equal to seventy-four feet.

From the foregoing it will be evident that, if the wheel revolves with its best speed, the water discharges in the direction $a$ $b$, and passes between the radial blades of the segment; but, if the wheel assumes any other speed, the oblique escape-jet will impinge upon the blades with a force proportional to the deviation from the true velocity, and move the governor-segment in a corresponding direction, whereby the valve at the jet-orifice will be acted upon, the quantity of water admitted changed, and, upon the wheel assuming its proper speed, the governing-segment will fall back to its original balanced position.

One great advantage of my improved wheel results from the tangential jet of water entering the buckets at one side, and flowing through the same to the other side, that end of the bucket which receives the water forming with the side of the wheel an angle not exceeding fifteen degrees, so as to receive the nearly tangential jet without impact, as illustrated by the diagram, Fig. 6.

I have shown in diagram, Fig. 6, buckets which form their own channel independently of the rims, and I suggest this form, as it presents less area, and, therefore, will cause less friction, particularly for small quantities of water, as it prevents the water spreading over the whole surface between the rims, and also affords more strength if the buckets are made of sheet metal.

My buckets are peculiar, in that they present an arc of small curvature from their receiving end to about the middle of the width of the rim—it does not exceed twenty degrees or thereabout; but from the termination of this arc to the discharging end of the bucket it has curvature of a very small radius.

A bucket constructed in this manner will discharge a perfectly unbroken stream, whether the quantity conforms to the full capacity of the bucket, or only to a small portion of the same.

The jet reaching the bucket between the beginning and ending of the slight curvature at a very acute angle, and then following the deeper curve under the influence of centrifugal force, which, being inversely proportioned to the radius of curvature, and said radius being very small, the water is forced to flow in a solid body free from disturbing elements along the bottom of the channel, until it discharges in a compact jet.

The action of the water on the bucket will cause filaments to separate; but, since their angle of deflection is small, they will be united again between the beginning and ending of that part of the bucket having a curvature with a short radius.

Tangential wheels, as heretofore constructed, are made with buckets just the reverse of mine—that is, they are the same as in turbine-wheels, and it is principally for this reason that tangential wheels yield such varying and unsatisfactory results for different portions of the gate which regulates the supply.

What I claim as my invention is—

1. A water-wheel having curved buckets or water-passages extending through it from face to face between inner and outer rims, in combination with the single water-pipe, which is arranged to discharge the stream of water tangentially upon the buckets as the buckets come in proper relation to the pipe, substantially as and for the purpose herein described.

2. The buckets or passages through a wheel, curved and set as described, in combination with a single pipe, which is arranged to discharge the water tangentially upon the buckets, substantially as and for the purpose set forth.

3. The automatic hydraulic governing-segment connected with a regulating mechanism, in combination with a water-wheel, substantially as and for the purpose described.

FREDERICK G. HESSE.

Witnesses:
   SAML. G. BROWNE,
   JAMES MASON.